July 17, 1951 G. J. SCHMITZ 2,561,143

FRUIT CRATE AND LINER

Filed Aug. 1, 1950

*INVENTOR.*
GEORGE J. SCHMITZ
BY
ATTORNEY

Patented July 17, 1951

2,561,143

UNITED STATES PATENT OFFICE 2,561,143

FRUIT CRATE AND LINER

George J. Schmitz, Kansas City, Mo.

Application August 1, 1950, Serial No. 177,049

6 Claims. (Cl. 220—63)

This invention relates to an improvement in a nesting crate or basket with a depending liner for the transportation of fresh fruit and more particularly bananas, the nesting feature being for return shipments of the empty baskets.

Heretofore nesting baskets have been used for general purposes and a few of them have been provided with removable liners, it being necessary to remove the liners before the baskets are nested.

This invention is another form of crate of my application for patent on Banana Crate filed October 4, 1949, and bearing Serial Number 119,419.

An object of the present invention is in the provision of an improved nesting or flared basket with a permanent liner that will nest within a like basket having a like liner and not chafe or wear out the liner from a like basket nesting therein.

Another object of the present invention is in the provision of an improved nesting basket with a support member thereon to limit the depth of one basket passing into another like basket to space the nesting or flared basket from the liner of a like basket into which it is nested.

Another object of the present invention is in the provision of an improved flared depending spaced liner in a nesting basket that will not allow the fruit to be bruised by the sides or bottom of the nesting crate or basket.

Another object of the present invention is in the provision of a nesting liner depending within a nesting basket with the top of the liner being supported beneath the top edge of the nesting basket to prevent a like basket resting upon or chafing the top edge and sides of the liner.

Another object of the present invention is to provide the old type of nesting basket, having spaced fulcrumed supports thereon for supporting a like loaded basket, with my improved flared depending liner therein and a depth spacing means for supporting a like basket thereon without chafing or wearing out the liner of the basket when the empty baskets or crates are nested with the liners in place for return shipment.

With these objects in view the invention may be more fully understood by the illustrated drawing, the following description and the scope of the appended claims.

Figure 3:
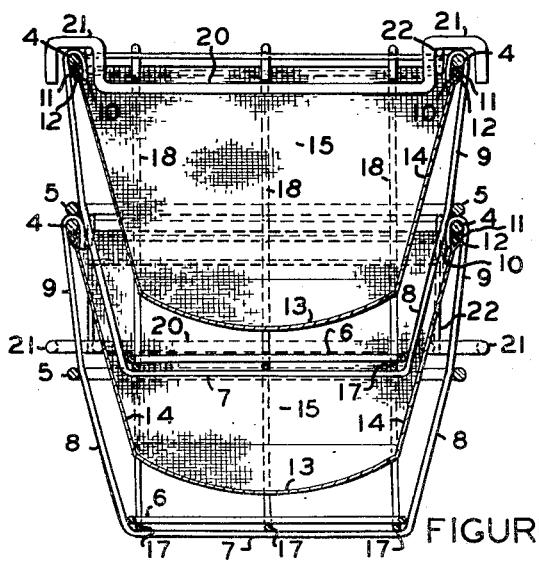

Figure 3 illustrates one improved basket with liner nested into a like basket with liner, the lower basket having the fulcrumed supports opened outward to receive the upper basket and the upper basket having side support members to rest upon the upper edge of the lower basket, the liner of the lower basket being supported below the upper edge of the lower basket to prevent chafing of the liner, the upper basket having its fulcrumed support resting in position to illustrate the support of a like basket when filled with fruit, the baskets being shown in a broken lateral interior view to illustrate more fully.

The wire basket as illustrated in the drawing has a heavy top wire 4 formed in an oblong rectangular shape, an intermediate spaced heavy wire 5 formed in a similar oblong rectangular shape and spaced beneath the heavy top wire 4, and a bottom small wire 6 formed in an oblong rectangular shape smaller than the oblong shapes formed by wires 4 and 5. The open type sides or walls of the basket are formed by a plurality of wires having a mid-length 7 in a horizontal position having equal adjoining lengths 8 bent up and flaring outward to pass inside of and connect to wire 5, the next adjoining equal lengths 9 continuous upward at a less inclined angle and then curve over the outside of wire 4 to the inside of the basket and have the ends 10 bent downward to clamp the flared liner top edges 11 on wire 12 forming an oblong rectangle for the liner adjacent and below wire 4.

The fabric or flexible liner is principally composed of a convex bottom 13 having tapered sides 14, and tapered ends 15. The sides 14 join the ends 15 at the seams or corners 16 and all sides and ends converge toward the bottom, the bottom having a shorter length than the top of the sides and a shorter width than the ends of the liner. The liner sides and ends have the upper edges 11 folded over the wire 12 and are secured by any convenient method such as sewing.

A part of the bottom and ends of the crate are formed by a plurality of wires having a mid-portion 17 in a horizontal position adjoining lengths 18 bent upward and diverging or flaring outwardly to pass inside of wire 5 to connect thereto, then continue upward and have the end portions 19 bent toward the inside of the crate over wire 4 and clamp the liner top edges 11 on wire 12 against wires 4 and 18. Wire 4 is spaced directly above wire 5 on the longitudinal sides by the side wires 7, and end wires 18 support the end portions of wire 5 which are located slightly closer to the longitudinal center of the crate or basket.

The two lateral support members 20 are provided for supporting a like basket and have their ends formed in an inverted U shape 21 to hook over the top edges of the basket sides and are held in position by spaced wires 22 fulcrumed at 23.

When one basket is nested into a like basket the liner remains in place, the upper crate or basket passes inside of the liner of the lower crate but is stopped from contact therewith by the stop wire member 5 secured to the sides of the basket. There is a definite space between each flared liner and each flared basket and the top wire 4 definitely protects the upper edge of the liner from wear or tear. The liners in these nesting baskets will wear much longer in shipping fruit than any other type used for nesting purposes, and the nesting feature saves bulk shipping space and considerable labor over other methods as well as protect the fruit from bruises.

It is obvious that the invention is a crate or a basket and has characteristics of both. The walls may be made as shown or constructed of sheet material either of solid or perforated type, the wire basket type being illustrated because it is simple, light and inexpensive to manufacture. The bottom member of the crate may be omitted to make a more inexpensive type of crate having four walls flaring from bottom to the top edges thereof.

Figure 1:
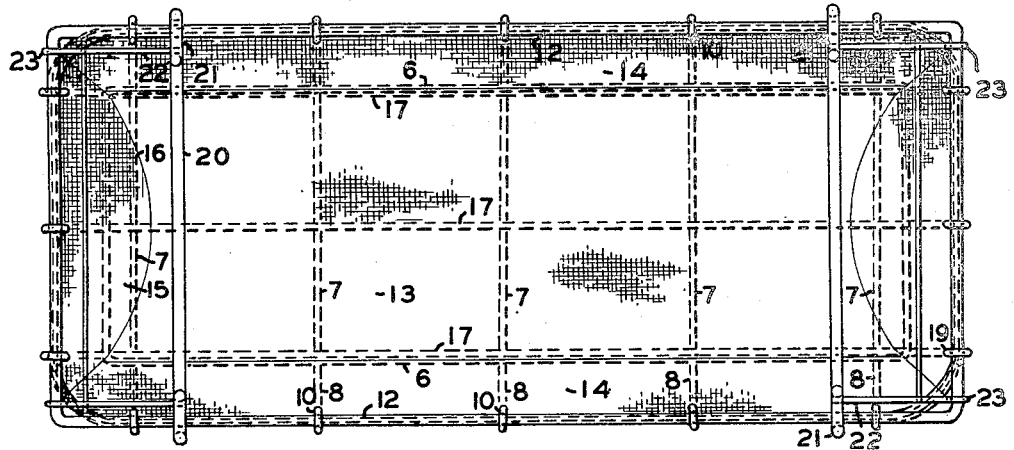
Figure 1 is a plan view of the improved flared basket or crate with the improved flared liner, the fulcrumed supports being in position to support a like basket when the baskets are packed for shipment.
Figure 2:
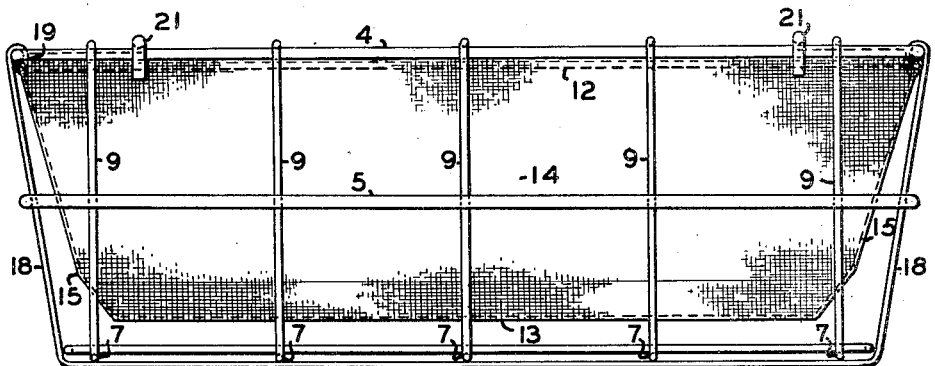
Figure 2 is a longitudinal elevation of Figure 1.

It is obvious that the crates are nested as illustrated in Figure 3 when being shipped empty. When the crates are filled with bananas or other fruit the crates have the lateral supports in position for stacking as illustrated in Figures 1 and 2.

What I claim as new and desire to secure by Letters Patent is the scope of the appended claims:

1. A fruit crate comprising side members having depth and length, said side members spaced apart and diverging upwardly, end members having depth and length, said end members spaced apart and diverging upwardly, said end members joined to said side members, the upper edges of said side and end members forming an opening of oblong rectangular shape, a support member, said support member secured to the side members at an intermediate position between the bottom and top of said side members, said support member spaced to rest upon the top of a like crate when the lower portion of said crate is suspended in a like crate, a liner formed with a convex bottom having side and end walls diverging upwardly, said side and end walls of said liner having the upper ends thereof secured to and beneath the top edges of said side and end members of said crate, and said liner depending within said crate and spaced from the side and end members of said crate below the upper edges of said liner.

2. A fruit crate comprising side members, said side members spaced apart and diverging upwardly, end members, said end members spaced apart and diverging upwardly, said end members joined to said side members, the upper edges of said side and end members forming an opening of oblong rectangular shape, support members, said support members secured to the side members at an intermediate position between the bottom and top of said side members, said support members spaced to rest upon the top of a like crate when the lower portion of said crate is suspended in a like crate, a liner formed with a bottom having side and end walls diverging upwardly, said side and end walls of said liner having the upper ends thereof secured to and beneath the top edges of said side and end members of said crate, and said liner depending within said crate and diverging from the side and end members of said crate.

3. A fruit nesting crate comprising a bottom member, side wall members, said side wall members spaced by said bottom member and diverging upward from said bottom member, end members, said end members spaced by said bottom member and diverging upward from said bottom, the upper edges of said side and end wall members forming an open rectangular shape, a bar member formed into an open rectangular shape, said bar member spaced beneath the top of said wall and end members, said bar secured to the outside of said wall and end members at an intermediate position between the bottom and top thereof, said bar member spaced and positioned to rest upon the top of a like crate, a liner formed with a convexed bottom having side and end walls diverging upwardly, said bottom of said liner being much smaller than the bottom of said crate, said side and end walls of said liner having the upper ends thereof secured beneath the top edges of said side and end walls of said crate, and said liner depending within said crate and diverging from the said wall members of said crate.

4. A fruit crate comprising side wall members, said side wall members diverging upwardly, said side wall members joined together to form an open rectangle, a support member, said support member secured to the sides of said walls at an intermediate position between the bottom and top of said wall members, said intermediate support member spaced to rest upon the top of a like crate when the lower portion of said crate is suspended in a like crate, a liner formed with a bottom having side and end walls diverging upward, said side and end walls of said liner having the upper edges thereof secured beneath and adjacent to the top edges of said side and end walls of said crate, and said liner depending within said crate and diverging downwardly from the said wall members of said crate.

5. A fruit crate comprising a bottom member, side wall members, said side wall members spaced by said bottom member and diverging upward from said bottom member, end members, said end members spaced by said bottom member and diverging upward from said bottom, the upper edges of said side and end wall members forming a rectangular shape, a support member, said support member secured to the outside of said wall members at an intermediate position between the bottom and top of said crate, said bar member spaced to rest upon the top of a like crate, a liner formed with a convexed bottom having side and end walls diverging upwardly, the bottom of said liner being much smaller than the bottom of said crate, said side and end walls of said liner having the upper ends thereof secured to the walls of said crate and beneath the top edges thereof, and said liner depending within the walls of said crate and diverging downward from the inside of said wall members of said crate.

6. A fruit nesting crate comprising a bottom having side walls diverging upward, a liner formed with a bottom having walls diverging upward, the bottom of said liner being much smaller than the bottom of said crate, the walls of said liner having the top edges thereof secured to the top edges of said crate walls, means to cover the top edges of said liner to protect it from wear, said liner suspended in said crate with the walls thereof diverging downward from the walls of said crate, a support, said support having a means on said crate to space the depth of said crate into a like crate to space the crate bottom above the liner of a like crate.

GEORGE J. SCHMITZ.

No references cited.